Jan. 20, 1959     W. M. DWYER     2,869,242
SINE GAGE
Filed Feb. 7, 1956

INVENTOR
Walter M. Dwyer
BY Rockwell Burchstone
ATTORNEYS

United States Patent Office 2,869,242
Patented Jan. 20, 1959

2,869,242
SINE GAGE

Walter M. Dwyer, Hamden, Conn., assignor to The Greist Manufacturing Company, New Haven, Conn., a corporation of Connecticut Application February 7, 1956, Serial No. 563,904

3 Claims. (Cl. 33—174)

This invention relates to improvements in sine gages especially adapted for supporting and angularly positioning at a predetermined angle work for die cutting and machining operations, and a principal object of the invention is to provide an improved device which simplifies and facilitates the operation of setting up a work piece in a predetermined angular position.

Devices of the type conventionally employed, in general require considerable time and specialized techniques for their operation. Other devices include slidably engageable members with the result that readings become unreliable on continued and extended frictional contact between the movable parts.

Figure 1:
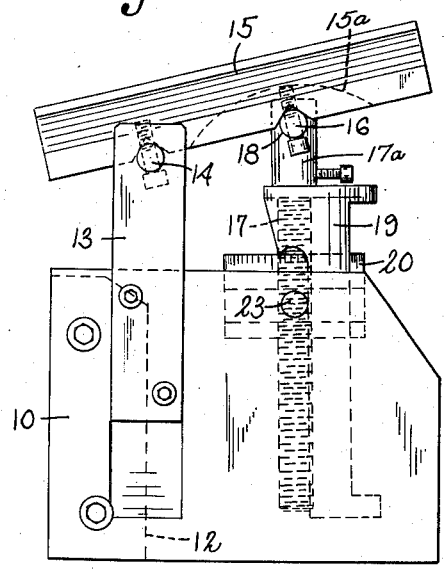
Figure 2:
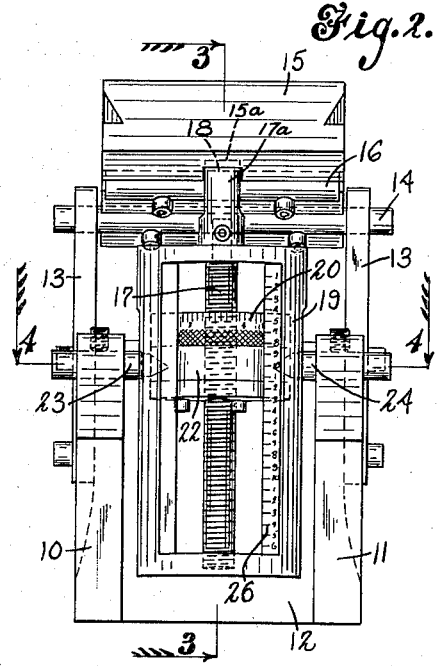
Figure 3:
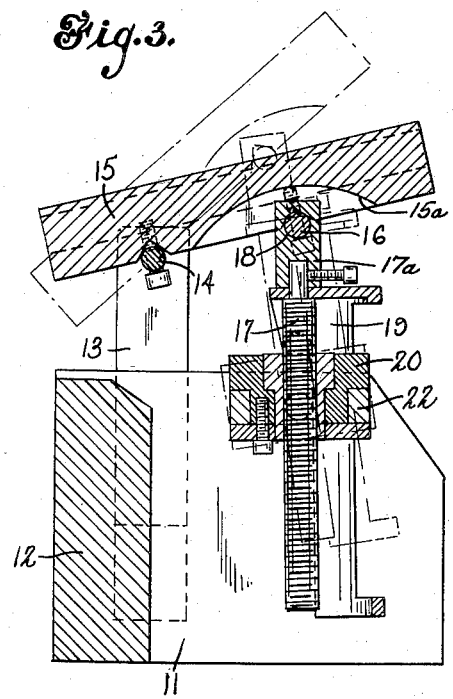
Figure 4:
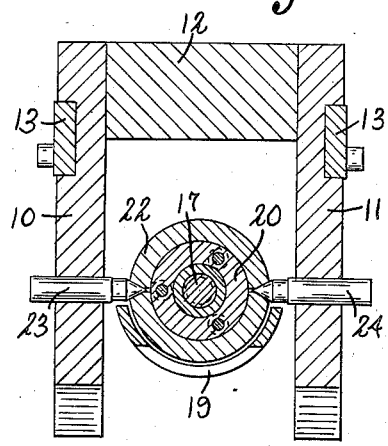

Another object of the present invention is to provide a sine gage which is positive in operation and wherein the elevation of the work-supporting member may be easily determined with accurate precision. These and other objects and advantages of the invention will appear from the following description and accompanying drawings showing an example of a device embodying the features of the invention, wherein:

Fig. 1 is a side elevation of the device;
Fig. 2 is a rear view of the device shown in Fig. 1;
Fig. 3 is a longitudinal section on the line 3—3 of Fig. 2; and
Fig. 4 is a transverse section on line 4—4 of Fig. 2.

Referring specifically to the drawings, it will be observed that the device comprises a frame of U-shape form in cross section consisting of spaced side members 10 and 11, which are connected by a rear wall 12. A pair of standards 13 are connected to the side members 10 and 11, and a rod 14 is rotatably mounted in the standards 13. To the rod 14 is secured a work-supporting member or block 15 which is designed to support the work or other object at a predetermined angle while being subjected to cutting operations or the like. The work-supporting member is angularly rockable about the pivot provided by the rod 14 in a manner to be presently described.

In order to determine the angle to which the work-supporting block 15 is to be set, a micrometer-like device is provided, this device, however, being swiveled so as to allow for the angular disposition of the work support 15. To the support 15 is secured a rod 16 at a point spaced from the rod 14, and to a screw-threaded member 17 is secured a head 17ª, which is pivoted at 18 to the rod 16. Mounted upon the screw-threaded member 17 is a cage 19 which moves up and down with the screw-threaded member by means presently to be described. The head 17ª extends upwardly into an arcuate 15ª in the support 15.

Threaded upon the screw-threaded member 17 is a circular nut 20 rotatably mounted in a collar 22. This collar 22 is supported upon pins or trunnions 23 and 24 secured to the spaced side members 10 and 11, respectively, so that the screw-threaded member 17, cage 19, circular nut 20, and the collar 22 are mounted for slight rocking motion as the angular disposition of the work support 15 is varied, as will be readily understood. It will be appreciated that this rocking motion of cage 19 and associated elements is essential since the pivot point 18 travels through an arc about the center point rather than vertically.

This latter permits movement of the supporting table 15 up and down about the pivot 14 by rotation of the nut 20, thereby precisely positioning the work-supporting block 15 at any predetermined desired angle. The circular nut 20 is, of course, held against vertical movement by virtue of the collar bearing 22 and the pins 23 and 24 so that rotation of the circular nut 20 imparts up and down movement to the screw-threaded member 17, the cake 19, work support 15, and associated elements.

As shown in Figs. 1 and 2, a scale 26 is provided at one side of the cage 19, whereby the sine value for any angular position of the work table 15 may be readily ascertained from appropriate tables. The circular nut 20 is likewise calibrated for the purpose of precisely ascertaining the angular degree of elevation corresponding to any intermediate point between the calibrations on the vertical scale 26.

The angle-forming device of the present invention may be employed in a variety of useful ways in the machine shop and tool room. One of its principal applications is for holding a work piece at a predetermined angle for machining purposes. Other applications and uses of the device will be readily apparent to those skilled in the art.

What I claim is:

1. An angle-measuring device comprising a frame, a work-supporting member pivotally mounted in said frame, a screw-threaded member pivoted at one end to the underside of the work-supporting member at a point spaced from said pivot position, a circular nut threaded to the free end of said screw-threaded member for elevating and lowering the work-supporting member, a circumferential collar within which said nut is rotatably supported, spaced, laterally directed trunnions for pivotally mounting said collar in the frame, a cage secured to the screw-threaded member and adapted for movement with said member on manual rotation of said circular nut, said cage including a vertical scale disposed in spaced relation to the screw threaded member and adjacent an edge of said circular nut, whereby the degree of angular elevation of the work-supporting member may be determined.

2. An angle-measuring device comprising a frame, a work-supporting member pivotally mounted in said frame, a screw-threaded member pivoted at one end to the underside of the work-supporting member at a point spaced from said pivot position, a circular nut threaded to the free end of said screw-threaded member for elevating and lowering the work-supporting member, a circumferential collar within which said nut is rotatably supported, spaced, laterally directed trunnions for pivotally mounting said collar in the frame, a cage secured to the screw-threaded member and adapted for movement with said member on manual rotation of said circular nut, said cage including a vertical scale disposed in spaced relation to the screw threaded member and adjacent an edge of said circular nut, whereby the degree of angular elevation of the work-supporting member may be determined, and the circular nut being calibrated for measuring fractions of degrees on said vertical scale.

3. A sine gage comprising spaced side members, a work-supporting member pivotally supported thereon to lie above the space between said members, a screw-threaded member pivoted at one end to the underface of said work-supporting member at a point spaced from the pivotal axis of the latter and extending into the space between the side members, an adjusting nut threaded upon the extended end of said screw-threaded member for elevating and lowering the work-supporting member upon rotation of the nut, a collar embracing the nut by which the latter is rotatably carried, and a trunnion member extending from each side member into said collar to pivotally support the latter and restrain it from other than pivoted movement, a scale member secured to the screw-threaded member and disposed in spaced relation to the latter adjacent the edge of the nut.

References Cited in the file of this patent

UNITED STATES PATENTS

| | | |
|---|---|---|
| 1,221,668 | Brunton | Apr. 3, 1917 |
| 1,409,343 | Karasick | Mar. 14, 1922 |
| 1,476,573 | Allen | Dec. 4, 1923 |
| 1,506,704 | Williamson | Aug. 26, 1924 |
| 1,595,733 | Rogach | Aug. 10, 1926 |
| 2,373,641 | Ackerson | Apr. 17, 1945 |
| 2,384,343 | Rondinone | Sept. 4, 1945 |
| 2,404,880 | Lateur | July 30, 1946 |
| 2,505,928 | Worby | May 2, 1950 |

OTHER REFERENCES

McDowell Abstract App. No. 634,131, pub. Aug. 15, 1950.